UNITED STATES PATENT OFFICE.

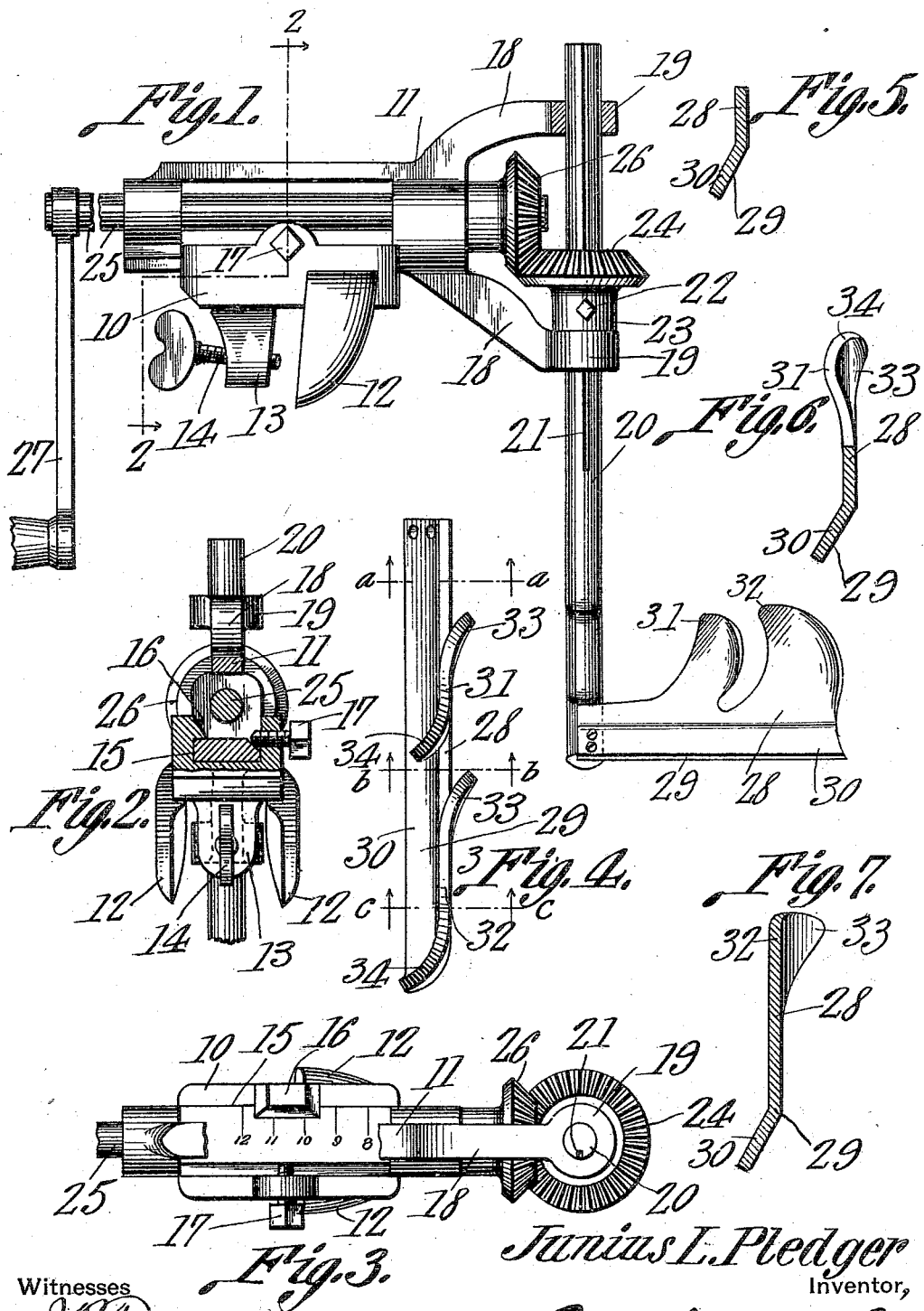

JUNIUS L. PLEDGER, OF THIBODAUX, LOUISIANA, ASSIGNOR OF ONE-HALF TO JOSEPH A. NAQUIN, OF THIBODAUX, LOUISIANA.

COFFEE-STIRRING MACHINE.

979,558.  Specification of Letters Patent.  Patented Dec. 27, 1910.

Application filed June 23, 1910. Serial No. 568,570.

*To all whom it may concern:*

Be it known that I, JUNIUS L. PLEDGER, a citizen of the United States, residing at Thibodaux, in the parish of Lafourche and State of Louisiana, have invented a new and useful Coffee-Stirring Machine, of which the following is a specification.

It is the object of the present invention to provide an improved device for stirring coffee while being roasted and the invention is directed chiefly to a device for use in connection with an open receptacle of any convenient size and shape in which the coffee is roasted.
Primarily, the invention aims to provide a stirring device for use in stirring coffee while the same is being roasted by the "Creole" process. In this process of roasting, the grains are roasted in an open vessel and are continuously stirred, usually, however, by a paddle held in the hand. Not only is this method of stirring the roasting coffee tiresome, but it requires an expert to properly and thoroughly perform the stirring operation as otherwise the grains will not be evenly heated.

The present invention has therefore as its first object to provide a device which may be applied to any ordinary open vessel in which coffee is to be roasted and which may be readily operated to thoroughly and effectually stir the coffee during the roasting process.

With the above object in view, the invention embodies, briefly stated, a member which may be removably mounted upon the wall of a vessel containing coffee to be roasted, a member mounted upon the first mentioned member and carrying a vertical stirrer shaft, the last mentioned member being adjustable upon the first mentioned member so that by adjusting the same, the stirrer shaft may be positioned axially with respect to the vessel and thereby be adapted to vessels of various diameters, the said shaft being furthermore vertically adjustable in the second mentioned member whereby the device may be adapted to vessels of various depths, and a drive shaft mounted in the second mentioned member and geared with the stirrer shaft, this drive shaft being adapted to be rotated by hand whereby to impart rotary movement to the stirrer shaft.

As heretofore stated, where coffee roasted by the "Creole" process is stirred by hand, expert manipulation of the stirring means is highly essential and it is customary to manipulate such means so as to cause a continual "flow" of the grains from all sides toward the center of the vessel and another "flow" from the center toward all sides and therefore the invention contemplates the provision of a stirrer blade of such specific form and outline as to, when rotated, stir the grains in the manner pointed out.

With the above and other objects in view, the invention consists in the general construction and arrangement of parts shown in the accompanying drawings, in which, Figure 1 is a view in side elevation of the device embodying the present invention, Fig. 2 is a sectional view on the line 2—2 of Fig. 1, Fig. 3 is a top plan view, Fig. 4 is a plan view of the stirrer blade removed from the stirrer shaft, Fig. 5 is a sectional view on the line *a—a* of Fig. 4, Fig. 6 is a sectional view on the line *b—b* of Fig. 4, and, Fig. 7 is a section on the line *c—c* of Fig. 4.

The device of the present invention embodies, among other elements, the body member indicated by the numeral 10 and a body member indicated by the numeral 11. Of the two body members, the one 10 is formed with downwardly projecting fingers indicated by the numeral 12 and located one at each side of the said body member, and, upon its under side, this member is formed with a boss 13 positioned in a line between the fingers 12. A clamping screw 14 is threaded through the boss 13 with its clamping end presented toward the fingers 12 and in applying the device to a vessel containing the grains of coffee to be stirred while being roasted, the member 10 is fitted upon the upper edge of the wall of the vessel, the said upper edge of the said wall being received between the fingers 12 and the bolt 13, and the clamping screw 14 is then turned to bear firmly against the outer surface of the wall whereupon the body member 10 will be firmly clamped, although removably so, in position upon the vessel. The upper side of the body member 10 is channeled as indicated by the numeral 15, this channel being afforded by forming the member upon its upper face at each side with an upstanding flange and the body portion of the body member 11 is fitted slidably between the flanges forming the channel 15 as is clearly shown in Fig. 2 of the drawings. One of the flanges 15 is formed with an overhanging inwardly projecting lug indicated by the numeral 16 which lug projects over that part of the member 11 which is fitted in the channel and serves to prevent the said member 11 being lifted out of the channel. For a purpose to be presently explained, it is desirable and expedient that means be provided for holding the member 11 at various points in its sliding adjustment upon the member 10 and this means is preferably embodied in a set screw 17 threaded through an upstanding ear upon the other one of the flanges 15 and bearing against that said portion of the member 11 which is slidably received in the channel in the member 10. At that end which is presented inwardly when the device is in position upon the wall of a vessel, the member 11 is formed with a yoke, the arms of which yoke are located in a vertical plane, they being indicated in the drawings by the numeral 18. The said arms 18 are formed at their ends with alined bearings 19 and journaled for rotation in these bearings is a vertical stirrer shaft 20. This shaft 20 is formed throughout the greater portion of its length, with a groove 21 and a screw 22 is threaded through the collar portion 23 of a bevel gear 24 and projects into the said groove 21 in the shaft 20. In this manner, the gear 24 is held for rotation with the shaft and it will be readily understood that the shaft may be adjusted up or down in its bearings without changing the position of the gear 24. The position assumed by the gear at all times is as illustrated in Fig. 1 in which figure the gear is shown as having its collar portion 23 resting upon the lower one of the yoke arms. A shaft 25 is journaled for rotation in bearings in the body of the member 11 in a horizontal plane and at its inner ends, this shaft 25 has fixed upon it a bevel gear 26 in mesh with the gear 24 and upon the outer end of the shaft 25 there is fitted a crank handle indicated by the numeral 27 by means of which handle the shaft 25 may be rotated and rotative movement thereby communicated to the shaft 20.

From the foregoing description of the operating mechanism of the device, it will be readily understood that the device may be readily applied to the walls of vessels of various diameters and that regardless of the diameter of any vessel to which the device is applied, within reasonable limits, the member 11 may be so adjusted upon the member 10 as to position the shaft 20 axially with respect to the vessel. Also it will be understood that not only may this adjustment be had, but, also, the shaft 20 may be adjusted up or down to suit the depth of the vessel and the quantity of coffee within the vessel.

At the lower end of the shaft 20 there is secured a stirrer blade which will now be specifically described. The blade just mentioned is indicated by the numeral 28 and throughout its entire length has its lower portion bent as at 29 so as to afford a concave face 30 which is presented in the direction of rotation of the blade. Upstanding from the upper edge of the body 28 of the blade is a pair of fins one of which is indicated by the numeral 31 and the other by the numeral 32. These fins are substantially identical in their general form and outline although the fin 32 is preferably larger than the fin 31 and is located outwardly beyond the said fin 31. Each fin has its upper inner corner curved rearwardly or in other words in a direction away from the direction of rotation of the blade, as indicated by the numeral 33 and each fin further has its upper outer corner curved forwardly or in other words in the general direction of rotation of the blade as indicated by the numeral 34. As a result, the upper edge of each blade is of ogee form. By giving to the fins of the blade the form here shown and described and by curving the lower portion of the body of the blade forwardly, the grains of coffee in the path of the rotating blade will be first elevated and then thrown by the curved corners of the fins toward the center of the pan so that the grains will flow continually from all sides toward the center and from the center toward all sides in a manner very similar to the currents in boiling water.

What is claimed is:—

1. In a device of the class described, a support comprising a relatively fixed member attachable to a vessel, said support having a body formed upon its upper side with spaced flanges, an adjustable member comprising a body having a portion upon its under side fitting slidably between the flanges, a set screw threaded through one flange and bearing against the said portion of the adjustable member, a drive shaft journaled horizontally in the adjustable member, a stirrer shaft journaled vertically in the adjustable member and adjustable vertically, and gear connections between the two shafts.

2. In a stirrer of the class described, a stirrer blade comprising a body having a fin projecting from one end thereof and having oppositely curved outer corner portions.

3. In a stirrer of the class described, a stirrer blade comprising a body having fins projecting from one edge thereof, each fin having oppositely curved outer corner portions, corresponding corners of the fins being correspondingly curved and presented.

4. In a stirrer of the class described, a stirrer blade comprising a body having lower portions curved forwardly continuously throughout its length, and fins projecting from the upper edge of the body and each having its outer corners oppositely curved, corresponding corners of the fins being correspondingly curved.

In testimony that I claim the foregoing as my own, I have hereto affixed my signature in the presence of two witnesses.

JUNIUS L. PLEDGER.

Witnesses:
ALBAN C. CAILLONET,
G. AUBIN DANTIN.